(12) United States Patent
Zhao et al.

(10) Patent No.: US 10,839,224 B2
(45) Date of Patent: Nov. 17, 2020

(54) MULTIVARIATE PROBABILITY DISTRIBUTION BASED SPORTS HIGHLIGHT DETECTION

(71) Applicant: INTERNATIONAL BUSINESS MACHINES CORPORATION, Armonk, NY (US)

(72) Inventors: Kun Zhao, Chiba (JP); Tetsuro Morimura, Tokyo (JP); Takayuki Osogami, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 144 days.

(21) Appl. No.: 16/165,491

(22) Filed: Oct. 19, 2018

(65) Prior Publication Data
US 2020/0125853 A1 Apr. 23, 2020

(51) Int. Cl.
*G06F 17/18* (2006.01)
*G06T 7/20* (2017.01)
(Continued)

(52) U.S. Cl.
CPC ......... *G06K 9/00724* (2013.01); *G06F 17/16* (2013.01); *G06F 17/18* (2013.01);
(Continued)

(58) Field of Classification Search
CPC combination set(s) only.
See application file for complete search history.

(56) References Cited

U.S. PATENT DOCUMENTS 7,313,269 B2 12/2007 Xie et al.
8,923,607 B1 12/2014 Kwatra et al.
(Continued)

OTHER PUBLICATIONS

Bojana V. Rosic, "Parameter identification in a probabilistic setting",Engineering Structures,vol. 50 , May 2013, pp. 179-194.*
(Continued)

*Primary Examiner* — Omar S Ismail
(74) *Attorney, Agent, or Firm* — Tutunjian & Bitetto, P.C.; Randall Bluestone (57) ABSTRACT

A method detects sports highlights for an event involving players and a play object. The method calculates a covariance matrix characterizing a two-dimensional variation of a multivariate probability distribution presumed for the players relative to a spatiotemporal tracking dataset corresponding to the players. The method calculates an area S occupied by the distribution as a function S(t) based on Eigenvalues calculated from the covariance matrix, derives a differential of the function S(t) and obtains an absolute value of the differential using a function $f(t)$. The method defines a function g(t) relative to a threshold $t_{threshold}$. The function g(t) assigns a first or second value responsive to a current time t meeting or exceeding, respectively, the threshold $t_{threshold}$. The method outputs as the sports highlight, a highest value from among local peaks extracted from a convolution of the functions $f(t)$ and g(t) and being within a range of the threshold $t_{threshold}$.

18 Claims, 7 Drawing Sheets

(51) Int. Cl.
  *H04N 5/247* (2006.01)
  *G06K 9/00* (2006.01)
  *G06F 17/16* (2006.01)
  *G06K 9/62* (2006.01)
  *G06T 7/70* (2017.01)

(52) U.S. Cl.
  CPC ....... *G06K 9/00765* (2013.01); *G06K 9/6214* (2013.01); *G06T 7/20* (2013.01); *G06T 7/70* (2017.01); *G06T 2207/20076* (2013.01); *G06T 2207/20084* (2013.01); *G06T 2207/30196* (2013.01); *G06T 2207/30224* (2013.01); *H04N 5/247* (2013.01)

(56) References Cited

U.S. PATENT DOCUMENTS

2003/0206710 A1* 11/2003 Ferman .............. H04N 21/4532
                                                        386/248
2009/0299184 A1* 12/2009 Walker .................... G06T 5/009
                                                        600/447
2016/0242690 A1*  8/2016 Principe ............. A61B 5/04012
2016/0314818 A1* 10/2016 Kirk ........................ G11B 27/10
2017/0238055 A1*  8/2017 Chang .................... A63F 13/60
                                                        725/19

OTHER PUBLICATIONS

Prof. Dr. Jürgen Kurths, "Temporal and spatial aspects of correlation networks and dynamical network models: analytical approaches and physical applications",Mathennatisch-Naturwissenschaftlichen Fakultät der Humboldt-Universität zu Berlin, Feb. 13, 2017, pp. 37-44,66-68.*

Yuan Wang,"Thresholded Multivariate Principal Component Analysis for Multi-channel Profile Monitoring",Cornell University, Mar. 16, 2016, pp. 6-16.*

Gudmundsson et al., "Spatio-Temporal Analysis of Team Sports—A Survey", arXiv:1602.06994v1 [cs.OH] Feb. 22, 2016, pp. 1-42.

Lucey et al., "Representing and Discovering Adversarial Team Behaviors using Player Roles", 2013 IEEE Conference on Computer Vision and Pattern Recognition, Jun. 2013, pp. 2707-2713.

Wei et al., "Large-Scale Analysis of Formations in Soccer", 2013 International Conference on Digital Image Computing: Techniques and Applications (DICTA), Nov. 2013, pp. 1-8.

* cited by examiner

Calculate the area $S$ occupied by the two-dimensional space of the multivariate probability distribution as a function $S(t) = \pi a_t b_t$, then derive the differential of the function $S(t)$ and obtain the absolute value of the differential of the function $S(t)$ using the function $f(t)$ as follows:

$$f(t) = \begin{cases} \left|\dfrac{dS(t)}{dt}\right|, & t \neq flag \\ 2f(t-1) - f(t-2), & t = flag \end{cases}$$

330

Define the function $g(t)$ as follows:

$$g(t) = \begin{cases} 1, & 10s \leq t \leq 0 \\ 0, & else \end{cases}.$$

Calculate the convolution of the functions $f(t)$ and $g(t)$ as follows:
$(f * g)(t) = \int f(\tau) g(t - \tau) d\tau.$

340

Extract, from the convolution, the local peaks within a range of 10s as follows:
$T = \{t | (f * g)(i)\}, i = [t - 10, t + 10], i \neq t.$
Choose the highest value from among the extracted local peaks in order to select the highlight.

MULTIVARIATE PROBABILITY DISTRIBUTION BASED SPORTS HIGHLIGHT DETECTION

BACKGROUND

Technical Field

The present invention generally relates to data processing, and more particularly to multivariate probability distribution based sports highlight detection.

Description of the Related Art

The detection of highlights from a sports match (e.g., a soccer game) is a challenging problem. Given the spatiotemporal tracking data, how to segment the match and detect the highlights are normally annotated by a human. An automatic method of finding the highlight part can alleviate this burden from a human.

A conventional method utilizes the (x, y) positions of players and a ball to segment the soccer match and detect the highlight part. However, this method uses supervised learning to segment the sports game. Accordingly, the labeling of the segments will necessarily incur a large time cost. Moreover, as vision-based systems currently do not provide perfect detection/tracking (e.g. missed or false detections), the lack of a position value may lead to error detections by the conventional method.

Hence, there is a need for a way to detect highlights without labeling in scenarios such as sports games.

SUMMARY

According to an aspect of the present invention, a computer-implemented method is provided for detecting sports highlights for a sporting event involving players and a play object. The method includes calculating, by a processor device, a covariance matrix characterizing a two-dimensional variation of a multivariate probability distribution presumed for the players relative to a spatiotemporal tracking dataset corresponding to the players. The method further includes calculating, by the processor device, an area S occupied by the multivariate probability distribution as a function S(t) that is based on Eigenvalues calculated from the covariance matrix, deriving, by the processor device, a differential of the function S(t), and obtaining, by the processor device, an absolute value of the differential using a function $f(t)$. The method also includes defining, by the processor device, a function g(t) relative to a highlight time detection threshold $t_{threshold}$, the function g(t) for assigning a first value or a second value responsive to a current time t meeting or exceeding, respectively, the highlight time detection threshold $t_{threshold}$. The method additionally includes outputting, by the processor device, as the sports highlight, a highest value from among local peaks extracted from a convolution of the functions $f(t)$ and g(t) and being within a range of the highlight time detection threshold $t_{threshold}$.

According to another aspect of the present invention, a computer program product is provided for detecting sports highlights for a sporting event involving players and a play object. The computer program product includes a non-transitory computer readable storage medium having program instructions embodied therewith. The program instructions are executable by a computer to cause the computer to perform a method. The method includes calculating, by a processor device, a covariance matrix characterizing a two-dimensional variation of a multivariate probability distribution presumed for the players relative to a spatiotemporal tracking dataset corresponding to the players. The method further includes calculating, by the processor device, an area S occupied by the multivariate probability distribution as a function S(t) that is based on Eigenvalues calculated from the covariance matrix, deriving, by the processor device, a differential of the function S(t), and obtaining, by the processor device, an absolute value of the differential using a function $f(t)$. The method also includes defining, by the processor device, a function g(t) relative to a highlight time detection threshold $t_{threshold}$, the function g(t) for assigning a first value or a second value responsive to a current time t meeting or exceeding, respectively, the highlight time detection threshold $t_{threshold}$. The method additionally includes outputting, by the processor device, as the sports highlight, a highest value from among local peaks extracted from a convolution of the functions $f(t)$ and g(t) and being within a range of the highlight time detection threshold $t_{threshold}$.

According to yet another aspect of the present invention, a computer processing system is provided for detecting sports highlights for a sporting event involving players and a play object. The system includes a memory device for storing program code. The system further includes a processor device for running the program code to calculate a covariance matrix characterizing a two-dimensional variation of a multivariate probability distribution presumed for the players relative to a spatiotemporal tracking dataset corresponding to the players. The processor device further runs the program code to calculate an area S occupied by the multivariate probability distribution as a function S(t) that is based on Eigenvalues calculated from the covariance matrix, derive a differential of the function S(t) and obtain an absolute value of the differential using a function $f(t)$. The processor device also runs the program code to define a function g(t) relative to a highlight time detection threshold $t_{threshold}$, the function g(t) for assigning a first value or a second value responsive to a current time t meeting or exceeding, respectively, the highlight time detection threshold $t_{threshold}$. The processor device additionally runs the program code to output, as the sports highlight, a highest value from among local peaks extracted from a convolution of the functions $f(t)$ and g(t) and being within a range of the highlight time detection threshold $t_{threshold}$.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to multivariate probability distribution based sports highlight detection.

In an embodiment, the present invention provides an automatic highlight detection method that uses a change of the distribution area of the players, who are presumed to have a multivariate probability distribution. In an embodiment, the present invention can use a convolution range that is determined by cross-validation.

Figure 1:
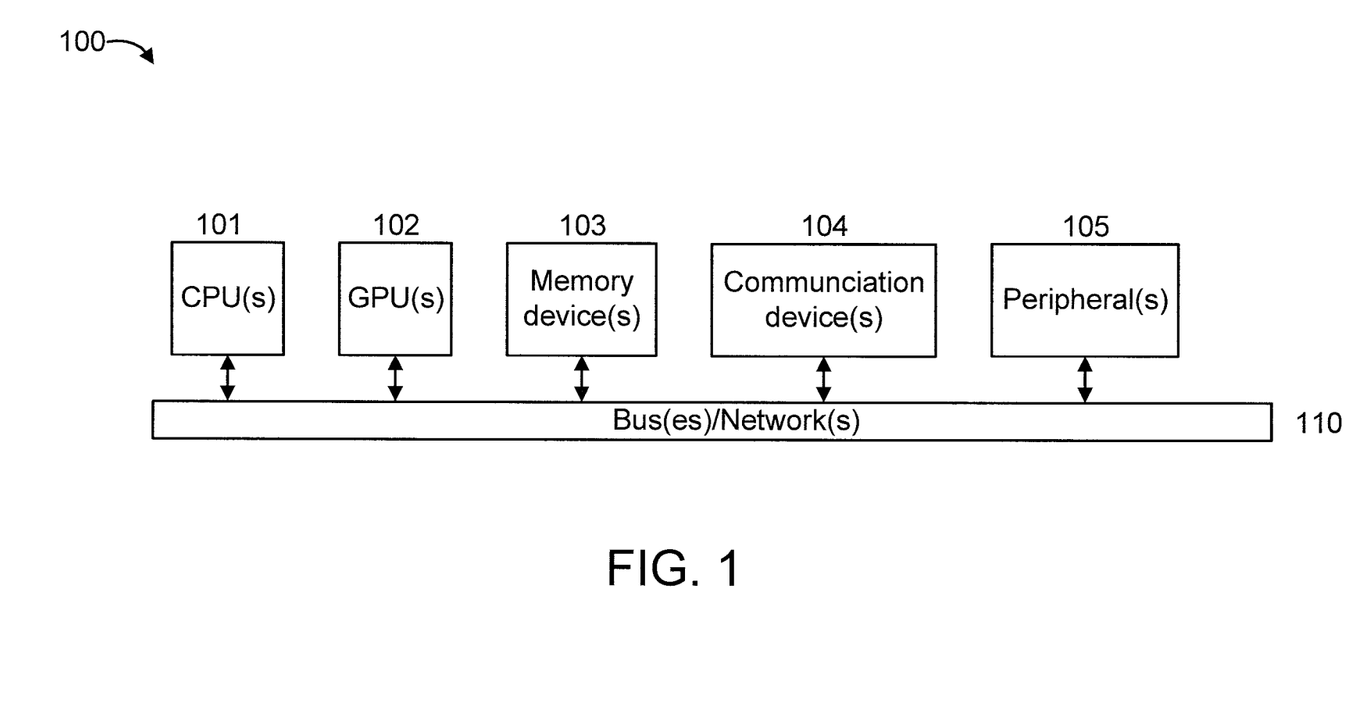
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 6-7). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
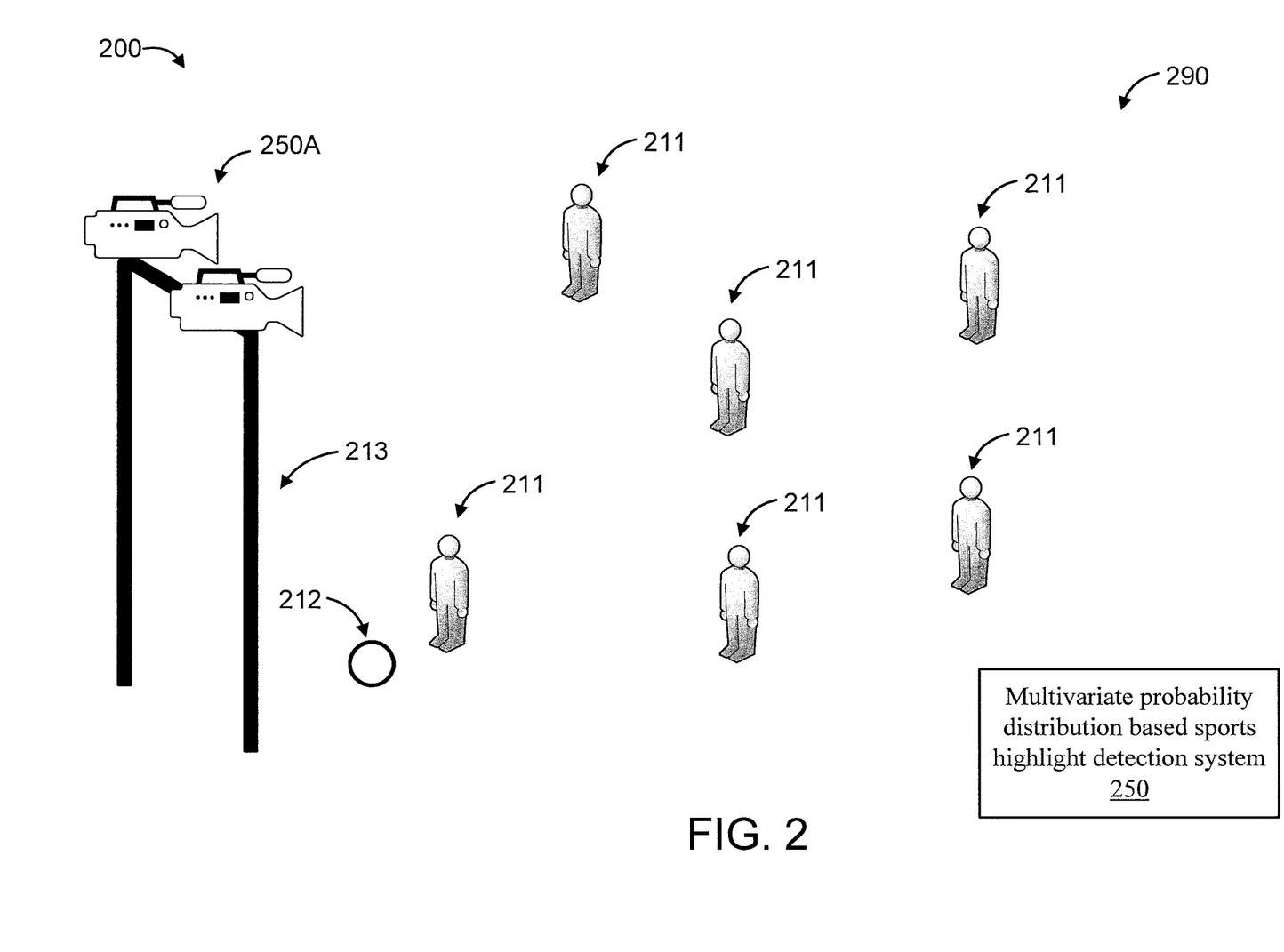
FIG. 2 is a block diagram showing an exemplary environment to which the present invention can be applied, in accordance with an embodiment of the present invention.

FIG. 2 is a block diagram showing an exemplary environment 200 to which the present invention can be applied, in accordance with an embodiment of the present invention.

Environment 200 is representative of a sports event, and includes multiple players 210 and a play object 220.

A multivariate probability distribution based sports highlight detection system 250 is applied to environment 200 in order to detect highlights in the sports event. The system is shown proximate to (e.g., in a control booth, etc.) a playing area 290, but can located anywhere including in the cloud and so forth.

The multivariate probability distribution based sports highlight detection system 250 can include a set of cameras 250A for capturing a spatiotemporal tracking dataset corresponding to the players 211 of the sporting event. The cameras 250A and a processing portion 250B of system 250 can each have transceivers for wireless communication (or can be connected by wires). In an embodiment, the set of cameras 250A can also capture the play object 212 in the spatiotemporal tracking dataset. In FIG. 2, a goalpost 213 is also shown, with some of the cameras 250A mounted thereon.

In an embodiment, multivariate probability distribution based sports highlight detection system 250 may be one node in a cloud-computing system that is task with detecting highlights for a given sporting venue, where a set of nodes are included in an overall highlight detection system across multiple venues involving the same type or different types of sports. Further descriptions of possible cloud-based aspects of the present invention are described herein below with respect to FIGS. 6-7. These and other implementations and variations of environment 200 are readily determined by one of ordinary skill in the art given the teachings of the present invention provided herein, while maintaining the spirit of the present invention.

Figure 3:
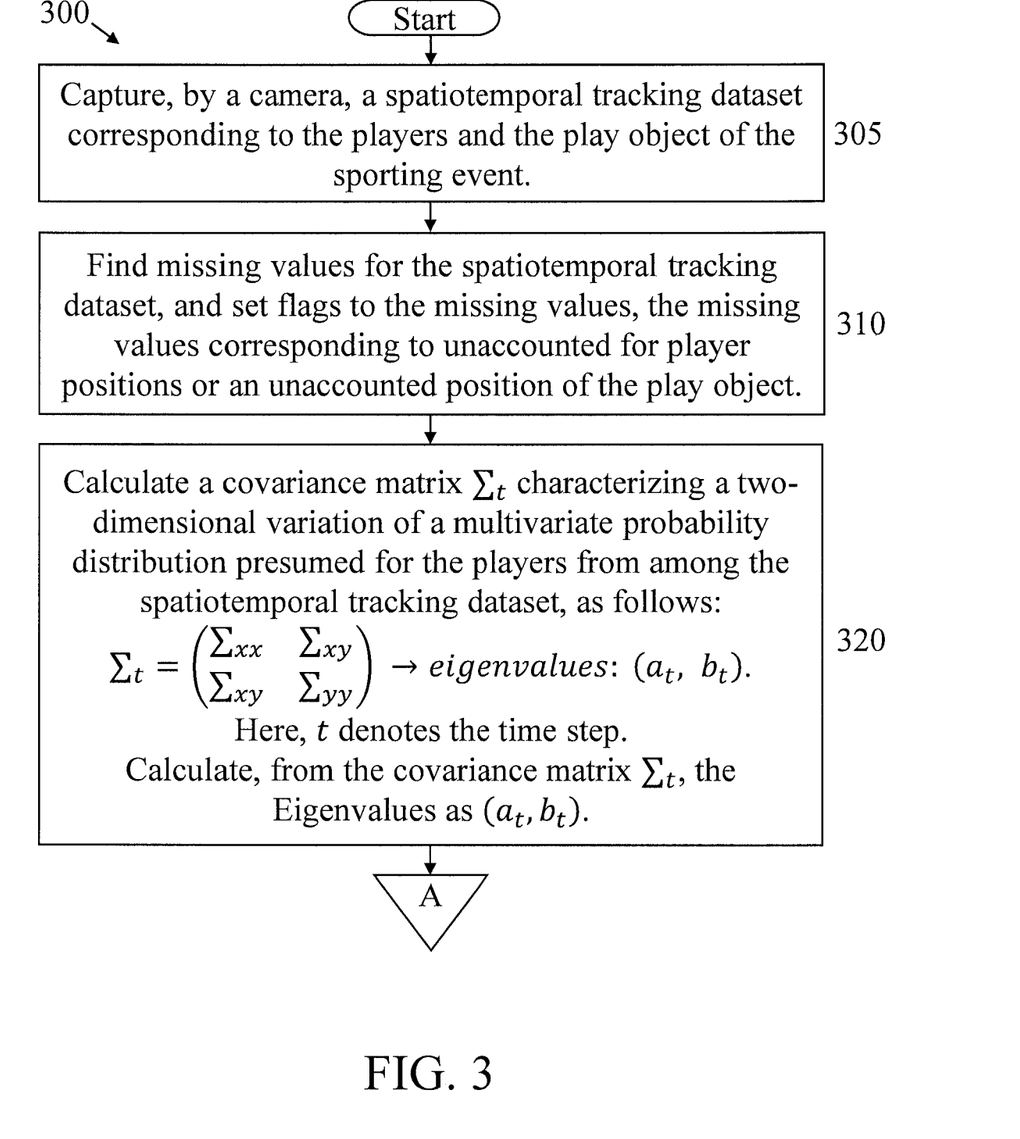
FIGS. 3-5 are flow diagrams showing an exemplary method for multivariate probability distribution based sports highlight decision, in accordance with an embodiment of the present invention.
Figure 4:
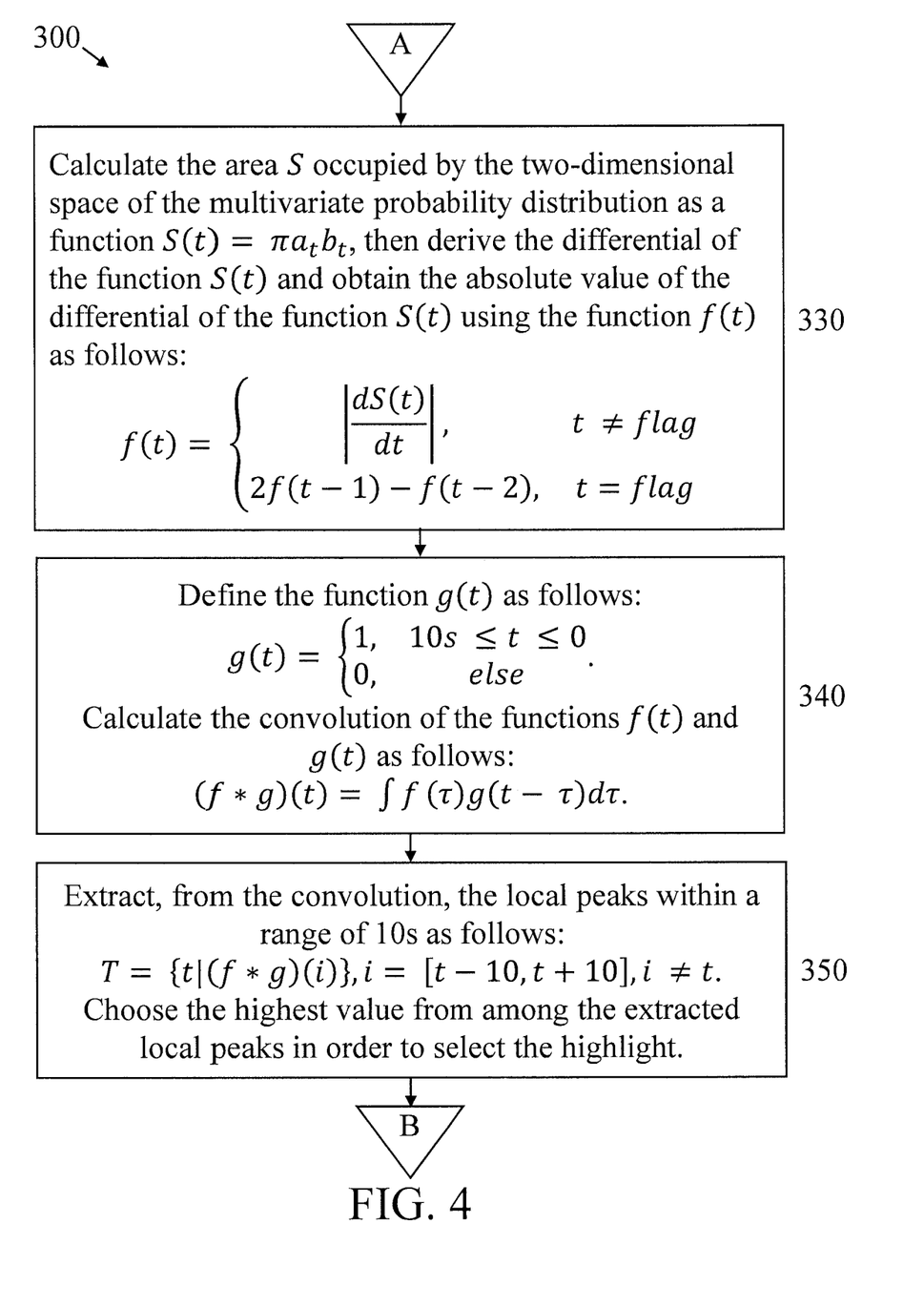
Figure 5:
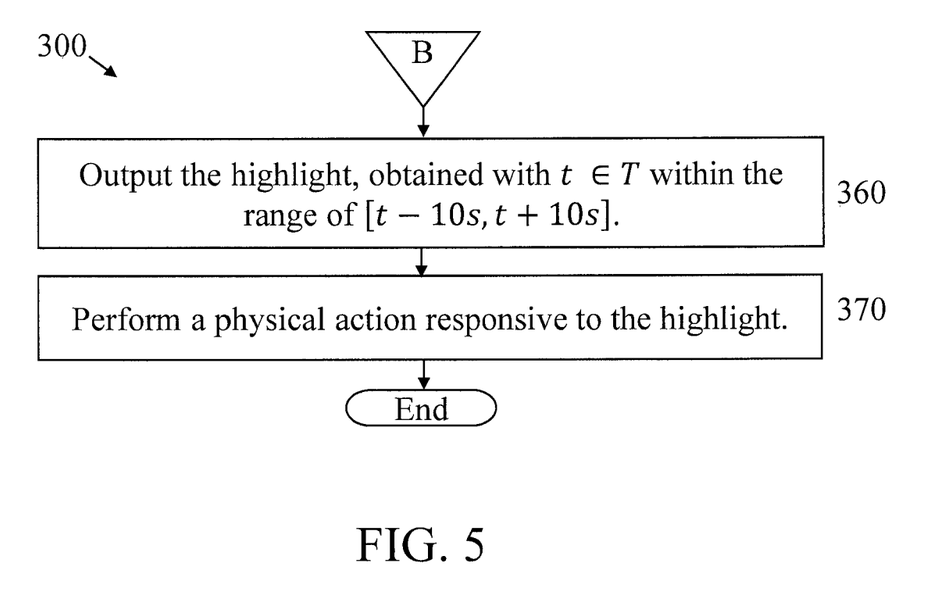

FIGS. 3-5 are flow diagrams showing an exemplary method 300 for multivariate probability distribution based sports highlight decision, in accordance with an embodiment of the present invention. The method 300 is applied relative to a sporting event having players and a play object. The sporting event can apply to any type of sports involving multiple players. The play object can be any item involved in the preceding sports event. For example, the play object can be, but is not limited to, a football, a soccer ball, a basketball, a tennis ball, a hockey puck, a hand ball, and so forth. Method 300 involves tracking player positions. In an embodiment, method 300 can also involve tracking a position of the play object used by the players. For the sake of illustration, the embodiment of FIG. 3 is described relative to a spatiotemporal tracking dataset involving both the players and the play object. However, in embodiments solely involving tracking the players, method 300 is simply modified by removing the references to the play object. In this way, the data and operations thereon are constrained to solely the players.

At block 305, capture, by a camera, a spatiotemporal tracking dataset corresponding to the players and the play object of the sporting event.

At block 310, find missing values for the spatiotemporal tracking dataset, and set flags to the missing values, the missing values corresponding to unaccounted for player positions or an unaccounted position of the play object.

At block 320, calculate a covariance matrix (e.g., a 2×2 matrix) $\Sigma_t$ characterizing a two-dimensional variation of a multivariate probability distribution (e.g., a Gaussian distribution, a Laplace distribution, etc.) presumed for the players from among the spatiotemporal tracking dataset, as follows:

$$\Sigma_t \begin{pmatrix} \Sigma_{xx} & \Sigma_{xy} \\ \Sigma_{xy} & \Sigma_{yy} \end{pmatrix} \rightarrow \text{eigenvalues: } (a_t, b_t).$$

Here, t denotes the time step.

Hence, also, at block 320, calculate, from the covariance matrix $\Sigma_t$, the Eigenvalues as $(a_t, b_t)$.

At block 330, calculate the area S occupied by the two-dimensional space of the multivariate probability distribution as a function $S(t)=\pi a_t b_t$, then derive the differential of the function $S(t)$ and obtain the absolute value of the differential of the function $S(t)$ using the function $f(t)$ as follows:

$$f(t) = \begin{cases} \left|\dfrac{dS(t)}{dt}\right|, & t \neq \text{flag} \\ 2f(t-1) - f(t-2), & t = \text{flag} \end{cases}$$

At block 340, define the function g(t) as follows:

$$g(t) = \begin{cases} 1, & 10s \leq t \leq 0 \\ 0, & \text{else} \end{cases}.$$

Here, the function g(t) assigns a value based on time range, where one value (i.e., 1) is assigned if t falls within the time range, and another value (i.e., 0) is assigned if t falls outside the time range. That is, the function g(t) assigns a first value or a second value responsive to a current time t meeting or exceeding, respectively, the highlight time detection threshold $t_{threshold}$.

Also, at block 340, calculate the convolution of the functions $f(t)$ and $g(t)$ as follows:

$$(f*g)(t) = \int f(\tau)g(t-\tau)d\tau.$$

At block 350, extract, from the convolution, the local peaks within a range of 10s as follows:

$$T = \{t|(f*g)(i)\}, i=[t-10, t+10], i \neq t.$$

Here, T denotes the extracted highlight periods.

Also, at block 350, choose the highest value from among the extracted local peaks in order to select the highlight.

At block 360, output the highlight, obtained with t∈T within the range of [t−10s, t+10s]. In an embodiment, block 360 can involve displaying the highlight on a display device. In an embodiment, block 360 can involve displaying the highlight in place of other programming for a duration of the highlight. The preceding can be performed responsive to a user selection/input. It is to be appreciated that the displaying can involve a review of a referee's call in order to validate or invalidate the call, and so forth. These and other actions are readily determined by one of ordinary skill in the art, given the teachings of the present invention provided herein, while maintaining the spirit of the present invention.

At block 370, perform a physical action responsive to the highlight. For example, in an embodiment, the physical action can include, but is not limited to, forwarding the highlight, as multimedia clip or video clip, to a recipient. The recipient can be pre-selected or dynamically selected based on a user input. In an embodiment, the physical action can include cataloging and storing the highlight with similar highlights for later viewing/distribution/etc. In an embodiment, the highlights can be processed by an image recognition system in order to categorize the highlight (e.g., a goal, a foul, etc.). A text-to-speech (TTS) system can be used to announce highlights and/or highlight types. These and other applications and actions to which the present invention can be applied are readily determined by one of ordinary skill in the art, given the teachings of the present invention provided herein, while maintaining the spirit of the present invention.

While a time range of 10s was used in method 300 for the sake of illustration, it is to be appreciated that other time ranges can be used, depending upon the implementation.

These and other variations to method 300 are readily contemplated by one of ordinary skill in the art, given the teachings of the present invention provided herein, while maintaining the spirit of the present invention.

It is to be appreciated that at least a portion of method 300 can be performed using a machine learning mechanism. For example, a convolutional neural network or some other type of neural network or learning mechanism can be used. Preferably, an unsupervised learning technique is used, so that the need for a lot of labeled data is avoided. In an embodiment, the convolution mentioned herein can be performed with respect to one or more convolution layers of a convolutional neural network, thus providing a learning mechanism specifically configured and optimized to perform the involved operation(s). Moreover, one or more max pooling layers can be used to select the largest local peak. One or more fully connected layers can be used to ultimately process one or more video sequences for a same candidate sports highlight or sporting event or so forth. These and other mechanisms and learning systems to which the present invention can be applied are readily determined by one of ordinary skill in the art given the teachings of the present invention provided herein, while maintaining the spirit of the present invention.

In an embodiment, method 300 can be provided as a cloud service in order to provide cloud-based sports highlight detection. The service could further offer actions that can be performed depending upon the detected highlight and/or one or more user preferences. The services can involve creating a highlights product (a memory device as a product for storing the highlights for user playback), and so forth. These and other implementations of method 300, including cloud and non-cloud-based implementations, are readily determined by one of ordinary skill in the art, given the teachings of the present invention provided herein, while maintaining the spirit of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
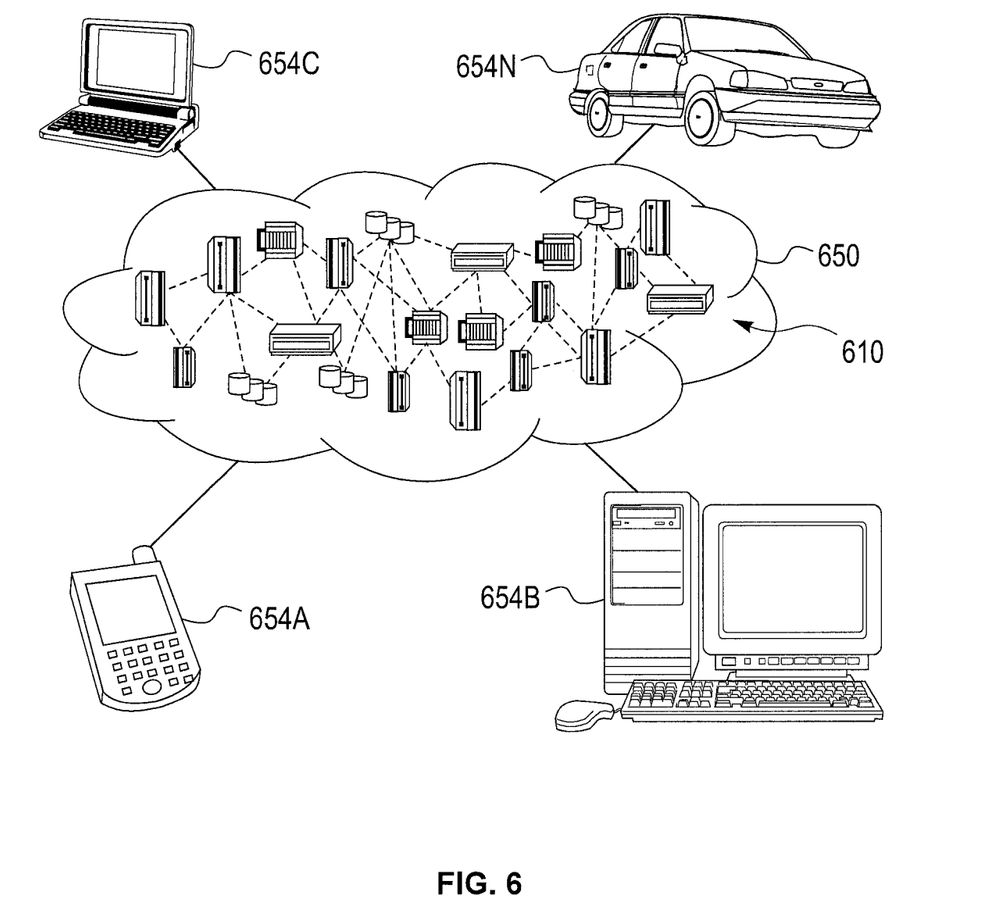
FIG. 6 is a block diagram showing an illustrative cloud computing environment having one or more cloud computing nodes with which local computing devices used by cloud consumers communicate, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
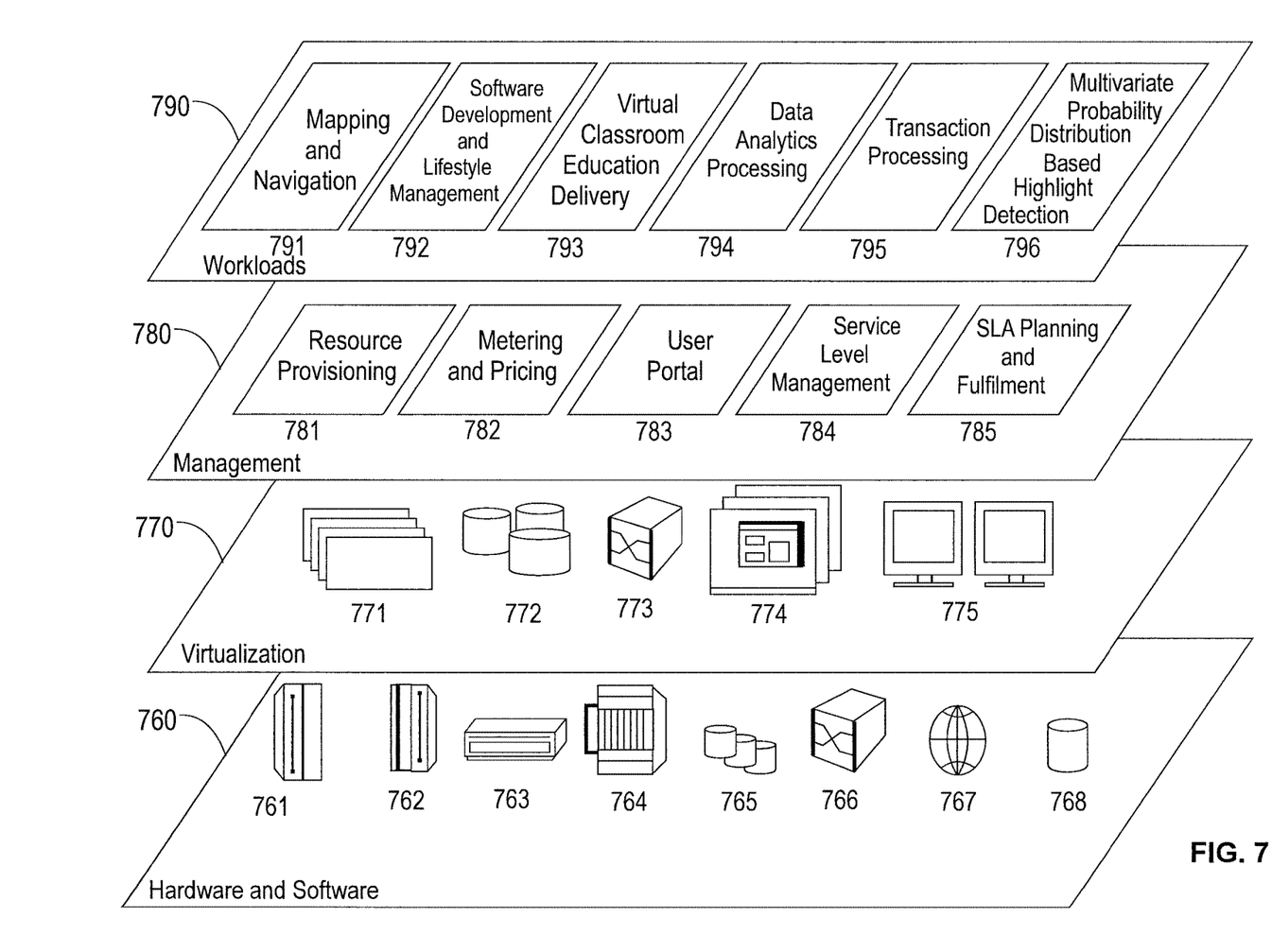
FIG. 7 is a block diagram showing a set of functional abstraction layers provided by a cloud computing environment, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and multivariate probability distribution based sports highlight detection 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for detecting sports highlights for a sporting event involving players and a play object, the method comprising:
    calculating, by a processor device, a covariance matrix characterizing a two-dimensional variation of a multivariate probability distribution presumed for the players relative to a spatiotemporal tracking dataset corresponding to the players;
    calculating, by the processor device, an area S occupied by the multivariate probability distribution as a function S(t) that is based on Eigenvalues calculated from the covariance matrix, deriving, by the processor device, a differential of the function S(t), and obtaining, by the processor device, an absolute value of the differential using a function $f(t)$;
    defining, by the processor device, a function g(t) relative to a highlight time detection threshold $t_{threshold}$, the function g(t) for assigning a first value or a second value responsive to a current time t meeting or exceeding, respectively, the highlight time detection threshold $t_{threshold}$; and
    outputting, by the processor device, as the sports highlight, a highest value from among local peaks extracted from a convolution of the functions $f(t)$ and g(t) and being within a range of the highlight time detection threshold $t_{threshold}$,
    wherein the sports highlight is selected within a range of $[t-t_{threshold}, t+t_{threshold}]$, where t is a time step.

2. The computer-implemented method of claim 1, further comprising finding existing missing values for a given spatiotemporal tracking dataset corresponding to the players, and setting flags to the missing values, the existing missing values corresponding to one or more unaccounted player positions.

3. The computer-implemented method of claim 1, wherein the highlight time detection threshold $T_{threshold}$ represents a time window during which highlights of the sports event are detected.

4. The computer-implemented method of claim 1, wherein using the function $f(t)$, both the differential is derived and the absolute value of the differential is obtained.

5. The computer-implemented method of claim 1, wherein a convolution range for the convolution is derived using a cross-validation technique.

6. The computer-implemented method of claim 1, further comprising capturing, by a set of cameras, the spatiotemporal tracking dataset corresponding to the players of the sporting event.

7. The computer-implemented method of claim 1, wherein the sports highlight is selected within a range of $[t-t_{threshold}, t+t_{threshold}]$, where t is a time step.

8. The computer-implemented method of claim 1, further comprising causing the sports highlight to be replayed on a user display device for the duration of the highlight and in place of regular programming.

9. The computer-implemented method of claim 1, wherein the covariance matrix is calculated as a 2×2 matrix.

10. The computer-implemented method of claim 1, wherein the spatiotemporal tracking dataset further corresponds to the play object such that the multivariate probability distribution includes the players and the play object.

11. A computer program product for detecting sports highlights for a sporting event involving players and a play object, the computer program product comprising a non-transitory computer readable storage medium having program instructions embodied therewith, the program instructions executable by a computer to cause the computer to perform a method comprising:
    calculating, by a processor device, a covariance matrix characterizing a two-dimensional variation of a multivariate probability distribution presumed for the players relative to a spatiotemporal tracking dataset corresponding to the players;
    calculating, by the processor device, an area S occupied by the multivariate probability distribution as a function S(t) that is based on Eigenvalues calculated from the covariance matrix, deriving, by the processor device, a differential of the function S(t), and obtaining, by the processor device, an absolute value of the differential using a function $f(t)$;
    defining, by the processor device, a function g(t) relative to a highlight time detection threshold $t_{threshold}$, the function g(t) for assigning a first value or a second value responsive to a current time t meeting or exceeding, respectively, the highlight time detection threshold $t_{threshold}$; and
    outputting, by the processor device, as the sports highlight, a highest value from among local peaks extracted from a convolution of the functions $f(t)$ and g(t) and being within a range of the highlight time detection threshold $t_{threshold}$,
    wherein the sports highlight is selected within a range of $[t-t_{threshold}, t+t_{threshold}]$, where t is a time step.

12. The computer program product of claim 11, wherein the method further comprises finding existing missing values for a given spatiotemporal tracking dataset corresponding to the players, and setting flags to the missing values, the existing missing values corresponding to one or more unaccounted player positions.

13. The computer program product of claim 11, wherein the highlight time detection threshold $T_{threshold}$ represents a time window during which highlights of the sports event are detected.

14. The computer program product of claim 11, wherein a convolution range for the convolution is derived using a cross-validation technique.

15. The computer program product of claim 11, wherein the method further comprises capturing, by a set of cameras, the spatiotemporal tracking dataset corresponding to the players of the sporting event.

16. The computer program product of claim 11, wherein the Eigenvalues are calculated as $(a_t, b_t)$, and wherein the function S(t) is calculated as $S(t)=\pi a_t b_t$.

17. The computer program product of claim 11, wherein the method further comprises causing the sports highlight to be replayed on a user display device for the duration of the highlight and in place of regular programming.

18. A computer processing system for detecting sports highlights for a sporting event involving players and a play object, the system comprising:

a memory device for storing program code; and
a processor device for running the program code to
calculate a covariance matrix characterizing a two-dimensional variation of a multivariate probability distribution presumed for the players relative to a spatiotemporal tracking dataset corresponding to the players;
calculate an area S occupied by the multivariate probability distribution as a function S(t) that is based on Eigenvalues calculated from the covariance matrix, derive a differential of the function S(t) and obtain an absolute value of the differential using a function $f(t)$;
define a function g(t) relative to a highlight time detection threshold $t_{threshold}$, the function g(t) for assigning a first value or a second value responsive to a current time t meeting or exceeding, respectively, the highlight time detection threshold $t_{threshold}$; and
output, as the sports highlight, a highest value from among local peaks extracted from a convolution of the functions $f(t)$ and g(t) and being within a range of the highlight time detection threshold $t_{threshold}$,
wherein the sports highlight is selected within a range of $[t-t_{threshold}, t+t_{threshold}]$, where t is a time step.

* * * * *